(No Model.)

R. PHILLIPS.
DEVICE FOR SPINNING TOPS.

No. 244,766. Patented July 26, 1881.

Witnesses.

Inventor.
Russell Phillips

UNITED STATES PATENT OFFICE.

RUSSELL PHILLIPS, OF BOSTON, MASSACHUSETTS, ASSIGNOR TO HIMSELF AND CHARLES CURTIS, OF SAME PLACE.

DEVICE FOR SPINNING TOPS.

SPECIFICATION forming part of Letters Patent No. 244,766, dated July 26, 1881.

Application filed June 6, 1881. (No model.)

*To all whom it may concern:*

Be it known that I, RUSSELL PHILLIPS, of Boston, in the county of Suffolk and State of Massachusetts, have invented a new and useful Improvement in Devices for Spinning Tops for the Amusement of Children, reference being made to the accompanying drawings, which form a part of this specification, like letters indicating like parts in the different figures thereof.

Figure 1:
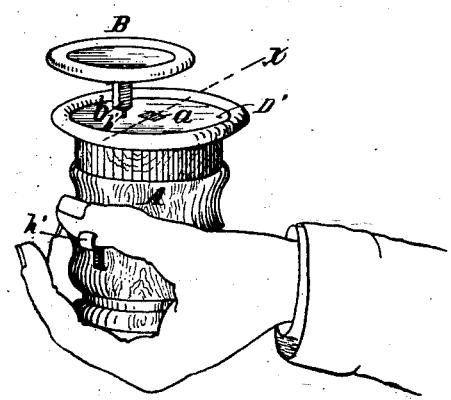
Figure 2:
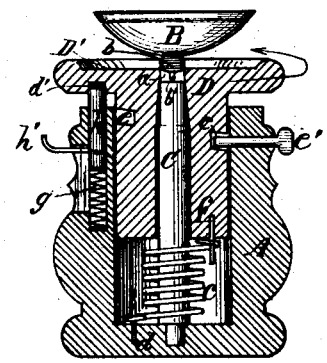

Figure 1 of the drawings is a view, in perspective, of my device, showing the same in actual use with the top spinning thereon. Fig. 2 is a section cut on the line $x$ of Fig. 1, and showing the device wound and the top in position ready for spinning.

My invention consists in a case with a spindle placed in the interior thereof and longitudinally of said case, and with a plug fitting into the case, the top of said plug forming the top or cover of said case, this plug being provided with a longitudinal perforation for the admission of said spindle, said perforation extending throughout the entire length of said plug. The plug is also provided with an annular slot, in which a key enters for regulating the action of the device, and is also provided with a pin, which pin acts, in conjunction with another pin placed in the bottom of the case, for the purpose of holding in place and regulating the motion of a winding-spring, which spring is placed in the case, resting upon the bottom thereof and over and around the spindle. Inserted in the case is a self-adjusting plug or key resting upon an adjusting-spring, said key being provided with a set-screw, which set-screw serves as a knob for working the device, and thus causing the top to spin, all combined and operating to produce the desired result, as will be hereinafter fully described and set forth.

A is the case, and C is a spindle, with one end thereof fastened to the bottom of said case, and in the interior thereof, in any suitable manner, preferably inserted as shown in Fig. 2, said spindle to be round, to be placed exactly in the center of the bottom of the case, to extend throughout the entire length of said case, and to be made in the shape and in the manner shown in Fig. 2.

D is a plug fitting into said case, and having a central longitudinal perforation throughout its entire length, in which perforation the spindle C is inserted, and fits as shown in Fig. 2, the top D' of said plug forming the top or cover to the case A. Said top D' has a hole, $a$, in the center thereof, through which hole the end of the spindle C extends when the device is not set for spinning. Said hole $a$ in said top D' and the spindle-plug $b$ of the top B are made in the same shape, preferably square, as shown in the drawings, said spindle-plug fitting easily in said hole.

The annular slot $e$ passes around the circumference of the plug D, and is made in said circumference. This slot does not pass directly around said plug, but passes around in the manner illustrated in Fig. 2, so that it is obvious that there is a point where the slot is broken, forming a shoulder. The key $e'$ is inserted through the case and into the slot, as shown in Fig. 2, and when the plug D has been turned one revolution said key strikes said shoulder, and the spiral spinning-spring $c$ should be sufficiently stiff so that with one revolution of the plug D said spring will acquire sufficient tension to give the top B a good momentum. The operation of producing said momentum will be hereinafter more fully described. The spiral spring $c$ is placed in the case A, resting upon the bottom thereof and encircling the spindle C, as shown in Fig. 2. Each end of said spring is bent, as shown, the lower end thereof being hooked over the pin $d$, which pin is fastened to the bottom of the case by any suitable means, and thus securing the spring for turning or winding.

The pin $f$ is attached to the lower end of the plug D, and passes within the upper hooked end of the spring $c$ for the purpose of turning or winding said spring. These two pins $d$ and $f$ are fastened in place preferably by inserting in the bottom of the case and in the end of the plug D, respectively, as shown in Fig. 2.

The spiral adjusting-spring $g$ is placed in the case A, as shown in Fig. 2, and upon said spring is placed the adjustable key $h$, with the set-screw $h'$ inserted in said key to serve as a handle or knob for working the key with the thumb or finger.

The operation of my invention may be described substantially as follows: The plug D is inserted in the case A, the spring $c$ occupying its place in the bottom of said case. The key $e'$ is inserted in the slot $e$. The plug D is then turned toward the right by turning the top D' thereof until one revolution is made, when said key $e'$ will strike the shoulder hereinbefore described, and at this juncture the end of the key $h$ which has during the turning borne against the under side of the top or cover D' will insert itself into the hole or opening $d'$ by the action of the spring $g$, and the device is set and locked. An examination of Fig. 2 will show that the slot $e$ does not pass directly around the plug D, as before stated, but that said slot ascends gradually upon the plug D as it passes around said plug, so that when the plug D is turned in winding said plug is gradually raised, and with it of course the cover D' rises as the key $e'$ follows round in the slot $e$ until one revolution is accomplished, when said key strikes the shoulder before described, which shoulder is formed at the point where the two ends of said slot would meet in boring the slot did said slot pass directly around the plug D; but in view of the formation of the slot, as before described, the existence of said shoulder is obvious. Before the winding is commenced the end of the spindle C extends through the hole $a$, and said end is flush with the outside surface of the cover D'. Now, as the cover D' rises while turning, as above described, it is obvious that when one revolution is made and the device is wound the outside surface of said cover D' will be above the end of the spindle C. The top B is then placed in position by inserting the spindle-plug $b$ into the opening $a$, said opening being of the same shape as said spindle-plug, as before described. The top B is shown in position in Fig. 2. All is now ready, and, the handle $h'$ being pressed downward, the plug D is unlocked and turns suddenly back in the direction indicated by the arrow in Fig. 2. By the action of the spring $c$ the cover D' is obviously lowered into the position it occupied before the device was wound. The top B being confined, as it is, in the opening $a$, is thus given a strong momentum, and when said cover D' assumes its original position the end of the spindle C is suddenly brought again flush with the upper or outside surface of said cover, and the top B revolves upon its spindle $b'$ upon the surface of said cover D'.

What I claim as new, and desire to secure by Letters Patent, is—

In a device for spinning a top, the case A, provided with the central longitudinal spindle, C, the self-adjusting key $h$, said key being provided with the adjusting-spring $g$ and with the handle $h'$, the plug D, perforated centrally and longitudinally, and provided with the annular slot $e$ and with the top or cover D', said cover having the opening $a$ in the center thereof, and the key-hole $d'$, the key $e'$, the spiral spinning-spring $c$, with the holding-pin $d$, and the turning-pin $f$, all constructed, arranged, and combined for the purpose of spinning a top, which top is provided with the spindle-plug $b$, said plug being made in the same shape as the opening $a$, and fitting easily therein, substantially as described.

RUSSELL PHILLIPS.

Witnesses:
BENJ. K. PRENTISS, Jr.,
FRANCIS M. BOUTWELL.